United States Patent
Moore et al.

(10) Patent No.: US 12,247,515 B2
(45) Date of Patent: Mar. 11, 2025

(54) POWER PRODUCTION PLANT INCLUDING LIQUID OXYGEN STORAGE AND METHOD OF OPERATION OF THE POWER PRODUCTION PLANT

(71) Applicants: Southwest Research Institute, San Antonio, TX (US); Jeremy Fetvedt, Raleigh, NC (US); Ian Cormier, Durham, NC (US)

(72) Inventors: James Jeffrey Moore, Midlothian, TX (US); Owen Pryor, San Antonio, TX (US); Jeremy Fetvedt, Raleigh, NC (US); Ian Cormier, Durham, NC (US)

(73) Assignees: Southwest Research Institute, San Antonio, TX (US); 8 Rivers Capital LLC, Durham, NC (US)

( * ) Notice: Subject to any disclaimer, the term of this patent is extended or adjusted under 35 U.S.C. 154(b) by 0 days.

(21) Appl. No.: 18/407,518

(22) Filed: Jan. 9, 2024

(65) Prior Publication Data
US 2024/0240587 A1 Jul. 18, 2024

Related U.S. Application Data

(60) Provisional application No. 63/438,805, filed on Jan. 13, 2023.

(51) Int. Cl.
*F02C 3/04* (2006.01)
*F02C 7/32* (2006.01)

(52) U.S. Cl.
CPC .................. *F02C 3/04* (2013.01); *F02C 7/32* (2013.01); *F05D 2220/32* (2013.01); *F05D 2240/35* (2013.01)

(58) Field of Classification Search
CPC .... F23L 7/007; F02C 3/04; F02C 7/32; F05D 2220/32; F05D 2240/35
See application file for complete search history.

(56) References Cited

U.S. PATENT DOCUMENTS 7,228,715 B2 * 6/2007 Brugerolle ............. F25J 1/0234
62/643
8,596,075 B2 * 12/2013 Allam ....................... F02C 3/20
60/39.5

(Continued)

OTHER PUBLICATIONS

Toby Lockwood, "Developments in oxyfuel combustion of coal," © IEA Clean Coal Centre Aug. 2014 (Year: 2014).*

(Continued)

*Primary Examiner* — David P. Olynick
(74) *Attorney, Agent, or Firm* — Livingston Law Firm

(57) ABSTRACT

Presently disclosed is a power production plant that is operable to store and generate power. In a "charge mode" (when electricity price is low), an air separation unit (ASU) cools and liquefies ambient air into liquid oxygen (LOx), which is then stored in a storage vessel. In a "discharge mode" (when electrical price is high), the stored LOx is used by the power production plant to combust a fuel and form a combustion product stream that can be expanded in a turbine to generate power. The power production plant particularly can utilize carbon dioxide as a recycled, circulating or working fluid so that substantially all carbon dioxide produced in the power production can be captured.

5 Claims, 1 Drawing Sheet

(56) References Cited

U.S. PATENT DOCUMENTS

| 8,755,916 | B2* | 6/2014 | Lou | F23L 7/007 |
| | | | | 703/2 |
| 2010/0242811 | A1* | 9/2010 | Court | F25J 3/04533 |
| | | | | 110/345 |
| 2021/0115849 | A1* | 4/2021 | Forrest | B01D 53/58 |

OTHER PUBLICATIONS

Bo Jin, "Self-optimizing control and safety assessment to achieve economic and safe operation for oxy-fuel combustion boiler island systems," Applied Energy 323 (2022) 119397, Available online Jul. 6, 2022 (Year: 2022).*

Bo Jin, "Plantwide control and operating strategy for air separation unit in oxy-combustion power plants," Energy Conversion and Management 106 (2015) 782-792, 2015 Elsevier Ltd. (Year: 2015).*

R. J. Allam, "The Oxy-Fuel, Supercritical CO2 Allam Cycle: New Cycle Developments To Produce Even Lower-Cost Electricity From Fossil Fuels Without Atmospheric Emissions," GT2014-26952, Copyright © 2014 by ASME (Year: 2014).*

* cited by examiner

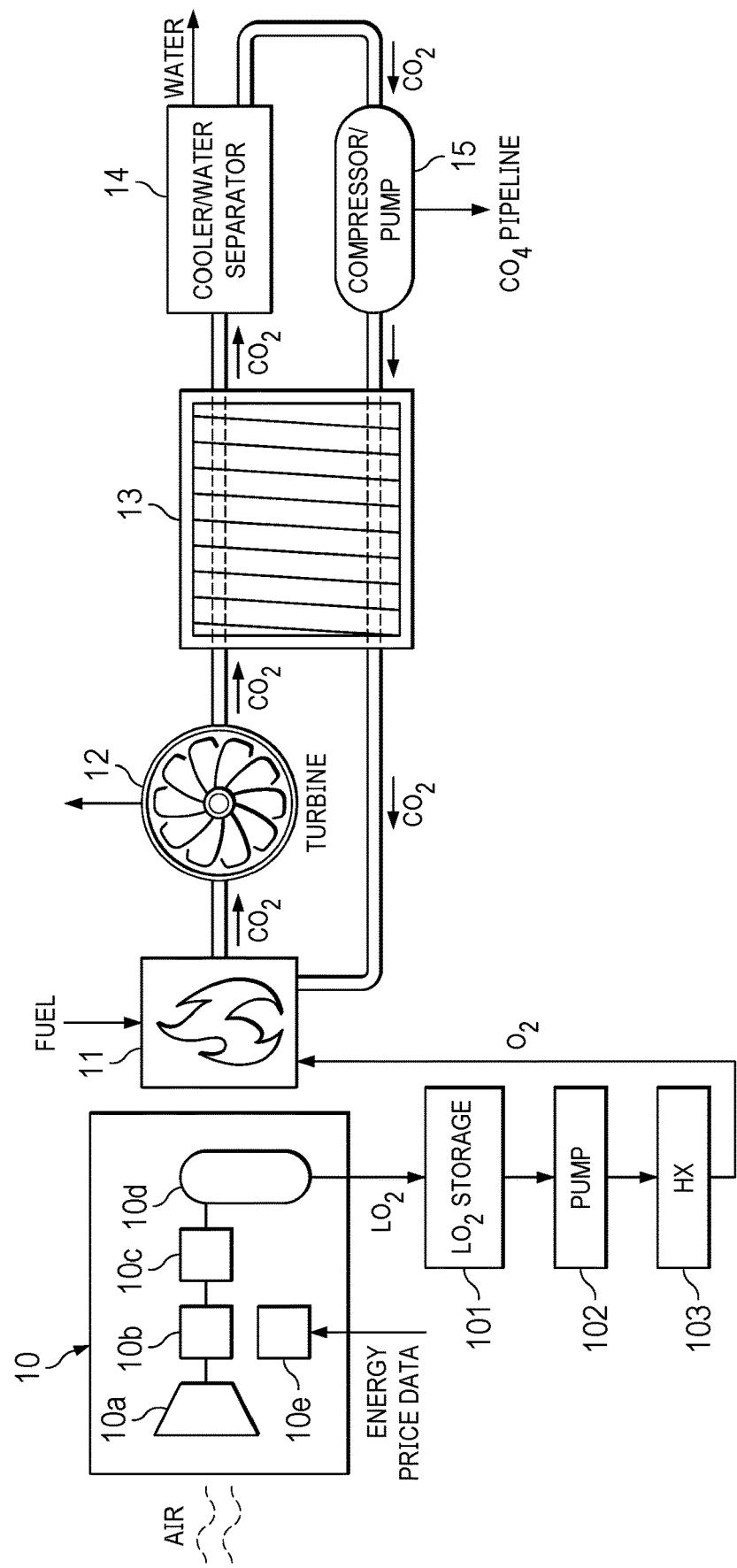

POWER PRODUCTION PLANT INCLUDING LIQUID OXYGEN STORAGE AND METHOD OF OPERATION OF THE POWER PRODUCTION PLANT

CROSS REFERENCE TO RELATED APPLICATION

This patent application claims the filing date benefit of U.S. Provisional Patent App. No. 63/438,805, filed Jan. 13, 2023, and entitled "Power Production Plant Including Liquid Oxygen Storage and Method Of Operation Of The Power Production Plant".

GOVERNMENT SUPPORT CLAUSE

This invention was made with United States Government Support under Contract No. DE-AR0001313 from the Department of Energy. The Government has certain rights in this invention.

FIELD OF THE INVENTION

The present disclosure relates to power generation plants or systems that include liquid oxygen storage. The disclosure further encompasses methods of operation of such power production plants.

BACKGROUND

Renewable energy, such as wind and solar energy, has become increasingly available in the market. The power output of these energy sources is variable depending on the time of day, season, or due to other unpredictable environmental factors (e.g., cloud cover) so that it can be difficult to provide a steady supply of energy throughout the year. Furthermore, total power production including renewables can exceed demand in some cases such that renewable energy production must be curtailed.

A solution to the renewable energy supply-demand mismatch problem is to store excess energy during periods of low demand. The energy can be used later when the energy from renewable sources is unavailable or peak demand is high. With planned future reliance on variable renewable energy, the ability to store energy for prolonged time periods is required to reduce the disruption of market fluctuations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates an example embodiment of oxy-fuel sCO2 (supercritical carbon dioxide) power plant having liquid oxygen storage in accordance with the present disclosure.

DETAILED DESCRIPTION

The present disclosure is directed to power production plants that include liquid oxygen (LOx) storage. The power production plants particularly can be configured for operation utilizing a carbon dioxide working fluid that is recycled for use through the plant. These can particularly be high efficiency power production plants known as oxy fuel sCO2 (supercritical carbon dioxide) power production cycles since the fuel is combusted utilizing substantially pure oxygen instead of air, and the combustion is carried out in the presence of the circulating sCO2. The presently disclosed power production plants or systems can be controlled in one or more embodiments to optimize its economic performance over a diverse range of operating conditions.

FIG. 1 illustrates an sCO2 oxy-fuel power plant with storage of liquid oxygen (LOx). As explained further below, an air separation unit (ASU) 10 is used to generate liquid oxygen and can also include storage vessels for the LOx. The LOx can be delivered for combustion in an oxy-fuel sCO2 power cycle. In this manner, the sCO2 power plant may be used to produce energy when energy demand exceeds supply, while displacing much of the cost of the ASU's energy requirements through cryogenic storage of LOX.

In one or more embodiments, ASU 10 can use a multi-column cryogenic distillation process to separate oxygen and nitrogen from ambient air. A liquefaction process can then be used to form LOx from gas through compression and cooling.

More specifically, ASU 10 cools and liquefies ambient air into its oxygen and nitrogen components. The basic operational elements of ASU 10 are a compressor 10a, purification system 10b, cooling system 10c, and distillation system 10d. Atmospheric air is compressed to high pressure using compressor 10a. The remainder of ASU 10 has various cryogenic heat exchangers, distillation columns and associated valves and piping.

Although an ASU may produce other components from air, for purposes of this disclosure, the LOx output of ASU 10 is of interest. A control unit 10e controls the ASU production and output of LOX as well as other tasks less significant to the present disclosure. As explained in greater detail below, certain embodiments of the present disclosure can make use of a control unit 10e that receives and is responsive to electrical energy prices to make automated adjustments to production of LOx, storage of LOX, and/or transfer of LOx to the power production plant.

A LOx cryogenic storage vessel 101 acts as a buffer between ASU 10 and the sCO2 power plant, and it can completely decouple ASU 10 from the sCO2 power plant. LOx can be safely stored in large quantities near atmospheric pressure for long periods of time.

Because ASU 10 operates independently of the sCO2 power plant, being decoupled by LOx storage vessel 101, LOx storage vessel 101 is akin to a battery. As explained below, LOx storage vessel 101 is filled ("charge mode") when electricity is in high supply (at low price electricity). LOx storage vessel 101 delivers LOx to the power plant ("discharge mode") when demand is high (at high price electricity). In other words, ASU 10 provides more LOx output during times when energy prices are low than when energy prices are high.

For energy production by the sCO2 power plant, the stored LOx from storage vessel 101 is sent through a pump 102 to increase pressure. The oxygen is then heated and vaporized in heat exchanger 103. The flow of CO2 between the cooler/water separator 14 and the compressor/pump 15 may be flowed through the LOx vaporizer, which provides thermodynamic benefit to the power cycle by increasing the density and reducing the power required for compressor/pump 15.

The oxy-fuel sCO2 power plant comprises primarily a combustor 11, turbine 12, heat exchanger (or recuperator) 13, and cooler/water separator 14. For example, the power plant can be configured as disclosed in U.S. Pat. No. 8,596,075, the disclosure of which is incorporated herein by reference in its entirety FIG. 1 is illustrative of embodiments of the disclosure, and it is understood that further components useful in operation of the power plant, such as those described in the noted U.S. Pat. No. 8,596,075, will be useful and may be omitted here for simplicity of disclosure.

While conventional power plant cycles produce power from turbines using water or steam as the working fluid, an sCO2 cycle uses CO2 that is in a supercritical state. An oxy-fuel power plant, sometimes also referred to as a direct-fired sCO2 power plant, is essentially a specialized Brayton cycle with three flows: fuel gas, which is compressed in the fuel compressor; oxygen, which is produced in an air separation unit, mixed with CO2, and then compressed; and a carbon dioxide working fluid. Thus, substantially all produced CO2 can be recycled through the power production cycle with any excess CO2 being provided in a condition ready for input to a pipeline to be sent for sequestration and/or for use in other industries.

The heated and vaporized oxygen is delivered to combustor 11 to burn with natural gas or other gaseous fuel like coal synthesis gas or hydrogen mixtures. Combustor 11 burns pure oxygen and fuel, producing a high-temperature exhaust stream that is mainly CO2 and water. The combustor exit is expanded through the turbine 12 and spins a generator thereby producing electricity. The sCO2 stream then enters a multi-flow heat exchanger (or recuperator) 13, where significant heat is transferred to the pressurized stream exiting the compressor/pump. The sCO2 stream is then directed to a cooler-separator 14, where its water and CO2 contents are split, leaving a high concentration of CO2. Most of that CO2 is compressed and reheated to supercritical pressure for reuse in the combustor. The surplus is transferred via pipeline for sale to use in enhanced oil recovery and other industrial use and/or for sequestration.

Part Load Operation

As explained further below, a feature of the present disclosure is the ability of ASU 10 to operate at full or part loads. It operates at full load during high electrical supply or excess electrical energy (low price). It operates at part loads during times when there is moderate electricity price.

For purposes of this description, "low cost electricity" refers to low-cost electrical energy available when supply exceeds demands. For example, excess energy may be available from renewable energy sources during conditions when energy availability exceeds demand. Such conditions may include high wind or high solar conditions. "Low cost electricity" may also include low-demand and low-cost electricity available from other sources.

During high electrical demand conditions and high prices, ASU 10 may be substantially shut down or placed in a standby mode, and the sCO2 power block operated using stored LOx. However, during moderate electrical prices, it may be desired to operate ASU 10 at part load to produce LOx for storage at a slower rate. To this end, compressor 10a is configured to operate efficiently at less than full load. Examples of compressors so configured are those with variable inlet control and/or variable exit guide vanes.

An advantage of LOX storage is that it will help flatten some of the peaks in the demand curve. This may require the sCO2 power plant to be turned down to follow the demand curve. However, a typical sCO2 power plant has turn down limits due to thermal stress and fatigue of the relatively thick sections of the turbine and recuperator hardware. This could prevent the powerplant from matching the estimated load curves.

Thus, a further feature of the invention is the use of various techniques to keep the exhaust temperature of turbine 12 constant over a range of loads. Specifically, turbine 12 is capable of varying the mass flow through the turbine while keeping the exhaust temperature nearly constant. This greatly improves the load ramping capability of the system; it allows varying power loads by maintaining near constant exhaust temperature and varying mass flow thereby eliminating thermal cycling of most of the hot components. The turbine case is actively cooled, so it does not experience temperature swings and fatigue due to load changes.

System Optimization

Economic modeling may be used to determine an optimal design for the system as well as optimal times to charge and discharge the system. First, various time-dependent factors such as ramp rates may be used generate an economic model for the system without storage considerations. The size of the storage system is then applied to create a realistic model of the plant operation. From the real plant operation model, parameters such as the amount of energy charged and discharged, capital expenditures, energy costs and revenue and other parameters can be calculated. The economic parameters are then combined to calculate the net present value (NPV) of the system for a given scenario. The model was then run through an optimization algorithm for a variety of geographic regions and large-scale scenarios (high solar penetration) to maximize the NPV based on multiple parameters. An example of a suitable optimization process is one developed with an operational model wrapped with a Python-based SMPSO (speed-constrained multi-objective particle swarm optimization) genetic algorithm using a Platypus library.

After each of the data sets was optimized independently, the optimized systems were compared for each data set to determine if there was a single design that could work for all regions and scenarios. Various energy markets, such as CAISO, ERCOT, MISOW, NYISO, PJMW, and Prince (with varying carbon taxes) may be considered. In one embodiment, it was determined that the best design across the data sets was the design for the PJM-W energy market with $150 carbon tax. This design incorporates an ASU with a maximum flow rate around unity (1.01) with the power plant but higher than average LOx storage (115,000 tons).

The operational parameters (excluding the ASU flow rate and storage capacity) were then re-optimized to determine how much of an improvement could be made compared to leaving all of the design variables constant. It was shown that the operational parameters and price thresholds could be adjusted to increase the NPV by up to $150MM for a 300 MWe power plant. The results presented here assume a future natural gas price of $4.87/MWh.

The grid of the future with high variable renewable energy penetration predicts to have significant price fluctuations. By adding LOx storage to an sCO2 power plant, significant improvement to the economics of the power plant is possible. Pricing models for different geographical regions vary in the duration and pricing levels, having a significant impact to the economics of the power plant. Most regions far exceed the NPV of $90 million, which is the value for a 300 MWe baseload plant determined using the approaches outlined above, with some regions as high as $600 million by taking advantage of lower energy costs during LOx production. These advantages in addition to the ability to capture high-pressure carbon dioxide provided by an sCO2 power cycle according to the present disclosure makes it an attractive option for future power generation needs.

What is claimed is:

1. A method of operating a power plant, the method comprising:

producing power in the power plant by expanding through a turbine a pressurized combustion stream arising from combusting a fuel with oxygen in a combustor in a presence of a pressurized carbon dioxide circulating fluid;

producing, using the power, liquid oxygen (LOx) from ambient air in an air separation unit (ASU) that is configured for independent operation at a full load capacity or a partial load capacity;

delivering the LOx from the ASU to a liquid oxygen storage vessel;

providing the LOx from the liquid oxygen storage vessel in a condition suitable for use as at least a portion of the oxygen in the combustor;

wherein operation of the power plant and the producing of the LOx in the ASU are independently controlled relative to an economic variable so that one or more of an amount of the LOx that is produced in the ASU, an amount of the LOx that is delivered to the liquid oxygen storage vessel, and an amount of the LOx that is provided for use in the combustor is adjusted responsive to a change in a value of the economic variable and while the power plant is generating the power, determining a price of the power is above a threshold value;

in response to the price of the power being above the threshold, shutting down the ASU or placing the ASU in a standby mode and producing the power using LOx from the liquid oxygen storage vessel.

2. The method of operating a power plant of claim 1, wherein the ASU has at least one compressor and during part load operations, the compressor of the ASU is controlled to have variable output.

3. The method of operating a power plant of claim 1, wherein the method further comprises ramping an amount of the power that is produced in the power plant to follow energy demand by maintaining a constant exhaust temperature of the turbine.

4. The method of operating a power plant of claim 1, further comprising sizing the ASU such that its maximum flow rate is substantially the same as a maximum flow rate of the pressurized combustion stream through the turbine of the power plant.

5. The method of operating a power plant of claim 1, wherein a storage capacity of the ASU is controlled based on at least the following parameters: an ASU flow rate, a regional energy market, and a cost of fuel that is combusted in the combustor of the power plant.

* * * * *